3,849,430
PROCESS FOR THE PREPARATION OF 3-ISO-THIAZOLONES AND 3-HYDROXYISOTHIAZOLES

Sheldon N. Lewis, Willow Grove, and George A. Miller, Glenside, Pa., assignors to Rohm and Haas Company, Philadelphia, Pa.
No Drawing. Continuation-in-part of abandoned application Ser. No. 621,770, Mar. 9, 1967. This application July 14, 1969, Ser. No. 841,548
Int. Cl. C07d 91/10
U.S. Cl. 260—302 A        9 Claims

ABSTRACT OF THE DISCLOSURE

Disclosed herein is a process for the preparation of substituted 3-isothiazolones and 3-hydroxyisothiazoles which involves reacting a disulfide-amide or a mercapto-amide with a halogenating agent. Compounds prepared in this manner have shown biocidal activity and are particularly effective for the control of microorganisms.

CROSS-REFERENCE TO RELATED APPLICATION

This application is a continuation-in-part of United States Ser. No. 621,770, filed on Mar. 9, 1967 (now abandoned).

BACKGROUND OF THE INVENTION

This invention relates to a novel process for the preparation of substituted 3-isothiazolones and 3-hydroxyisothiazoles. More particularly, this invention relates to a process for the preparation of compounds of the formula

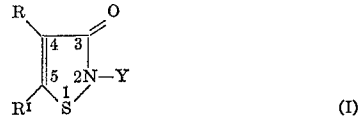

wherein Y is hydrogen, an alkyl group of 1 to 18 carbon atoms, a cycloalkyl group of up to 10 carbon atoms, an aralkyl group of up to 10 carbon atoms, an aryl group of up to 10 carbon atoms, a halogen-, lower alkyl-, or lower alkoxy-substituted aryl group, a cyanoalkyl group, a carbalkoxyalkyl group, a haloalkyl group, an alkoxyalkyl group, an aryloxyalkyl group of up to 12 carbon atoms, an aralkoxyalkyl of up to 12 carbon atoms group, a dialkylaminoalkyl group, an alkylacyl group of up to 8 carbon atoms, a lower alkylsulfonyl group, or arylsulfonyl group of up to 10 carbon atoms, a cyano group, or a carbamoyl group having the structure

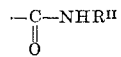

R and $R^I$ may be hydrogen, halogen, or a lower alkyl group; and $R^{II}$ may be an alkyl group of 1 to 18 carbon atoms, a lower alkylsulfonyl group, an arylsulfonyl group of up to 10 carbon atoms, a halogen- or lower alkyl-substituted arylsulfonyl group, a carbalkoxyalkyl group of the structure

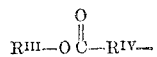

wherein $R^{III}$ is a lower alkyl group and $R^{IV}$ is an alkylene group of 1 to 4 carbon atoms, or an aryl group of the formula

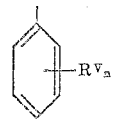

wherein $R^V$ may be a lower alkyl group, halogen, nitro or a lower alkoxy group and $n$ is an integer from 0 to 3.

When Y is a substituted alkyl group, the alkyl portion of the group will preferably contain up to 8 carbon atoms.

It should be noted that Formula I is a chemically current designation for all of the compounds prepared by the novel process of this invention. However, due to the tautomeric nature of isothiazoles in which Y represents hydrogen, the following formula may also be employed:

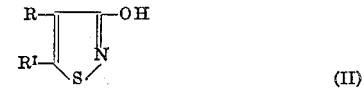

The compounds represented by Formula II are referred to generically as "3-hydroxyisothiazoles," (hereinafter referred to at times as "isothiazoles"), while the other compounds encompassed within Formula I are generally termed "3-isothiazolones" (hereinafter referred to at times as "isothiazolones"). The term "isothiazolones" may be used to designate any of the compounds within the scope of Formula I.

Where the expression "lower" is employed in conjunction with such terms as, for example, alkyl, cycloalkyl, aralkyl, alkylsulfonyl, etc., it is intended to indicate that the alkyl or alkyl portion of the group has 1 to 4 carbon atoms. Typically, the alkyl or alkyl portion may be methyl, ethyl, n-propyl, isopropyl, t-butyl or n-butyl.

According to the invention, isothiazoles and isothiazolones are prepared by the oxidation cyclization of a disulfideamide having the formula

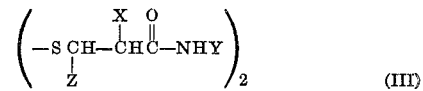

or, a mercapto-amide having the formula

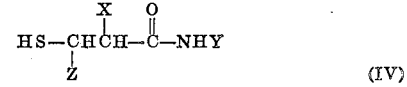

wherein X and Z are hydrogen or lower alkyl and Y is as defined above. The cyclization is accomplished by contacting the amide with a halogenating agent. Typical halogenating agents include chlorine, bromine, sulfuryl chloride, sulfuryl bromide, N-chlorosuccinimide, N-bromosuccinimide, and the like. Chlorine and sulfuryl chloride are the preferred halogenating agents.

Cyclization of one mole of the disulfide-amide will take place when 3 mole equivalents of halogenating agent are employed in the reaction. By providing an excess of halogenating agent, the isothiazolone may be halogenated at the 4- and/or 5-positions of Formula I. Where 5 mole equivalents of halogenating agent are available, monohalogenation can take place. For dihalogenation, 7 mole equivalents of halogenating agent is the stoichiometric amount.

Cyclization of one mole of the mercapto-amide will take place when 2 mole equivalents of halogenating agent are employed in the reaction. By providing an excess of halogenating agent, the isothiazolone may be halogenated at the 4- and/or 5-positions of Formula I. Where 3 mole equivalents of halogenating agent are available, monohalogenation can take place. For di-halogenation, 4 mole equivalents of halogenating agent is the stoichiometric amount.

Preparation of isothiazolones having the 4- and 5-position substituted with different halogens can be achieved by the halogenation of an isothiazolone already halogenated at one of the two positions in question. For example, a 4-bromo-5-chloro-3-isothiazolone can be obtained by bromination of a 5-chloro-3-isothiazolone. The starting isthiazolone is prepared by the cyclization of a disulfide-amide or a mercapto-amide as described above. Procedures and variations for what might be termed "secondary halogenation" will be evident to one skilled in the art.

Temperature is not critical to the cyclization process, and the cyclization will proceed over a broad temperature range. Generally, the cyclization will be carried out in the range of about 0° to 100° C.

The reaction is preferably carried out in an inert non-aqueous solvent, such as benzene, toluene, xylene, ethyl acetate, ethylene dichloride, 2-nitropropane and the like.

Isothiazolonium salts may be formed along with the isothiazolones during the cyclization process when Y in Formula III or Formula IV is hydrogen, alkyl or substituted alkyl, aralkyl or substituted aralkyl, and aryl or substituted aryl. Such salts have the following structure:

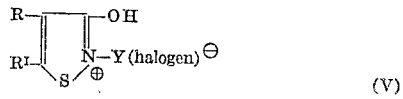

(V)

wherein Y is as stated immediately above and R and $R^I$ are the same as in Formula I. Where desired or necessitated, an acid scavenger can be incorporated in the reaction medium so as to avoid isothiazolonium salt formation. Typical scavengers which can be utilized include t-amine bases, such as, for example, pyridine and triethylamine. It should be noted that the isothiazolonium salts can also be transformed or neutralized to free isothiazolones by being contacted with water or weak organic bases. Such procedures are, of course, within the skill of one proficient in the art.

To separate, if desired, the products prepared by the novel process described herein from the reaction solution any of the known techniques can be employed. Generally, separation may involve distillation, crystallization, filtration and the like, or combinations of these procedures.

The disulfide-amides which are cyclized to form the isothiazolones of Formula I are known and can be prepared in several ways. Typically, an alpha or beta mono- or di-substituted acrylate ester of acrylic acid is reacted with thioacetic acid. Upon completion of the reaction, the product is hydrolyzed to obtain a beta-mercaptopropionic acid, which is, in turn, oxidized to the disulfide acid. This material is then converted to a diacid chloride-disulfide, and then treated with ammonia or substituted ammonia derivatives, such as alkyl amines, aniline, amides, cyanamide, sulfonamides, urea or substituted ureas and the like.

The mercapto-amides which are cyclized to form the isothiazolones of Formula I are also known and can be prepared in several ways. In a preferred method, a beta-mercaptopropionic acid, prepared as described above, is reacted with an alcohol to form a beta-mercaptopropionate ester, which is then treated with ammonia or substituted ammonia derivatives to form the mercapto-amide. As stated previously, numerous procedures can be employed to obtain these disulfide-amides and mercapto-amides and many are readily available in commercial quantities. Variations in their preparations will, of course, exist depending on the substituents to be employed in any particular cyclization.

The isothiazoles and isothiazolones of Formula I and their salts, represented by Formula V, are biocidally active compounds, and as such, are suitable for the control of living organisms and particularly microorganisms. For this reason, they are especially effective bactericidal, algaecidal, fungicidal, slimicidal, and pesticidal agents. Furthermore, these novel compounds possess the unexpected property of being resistant to inhibition by common additives or contaminants, such as lecithin, normal horse serum, alkylbenzene sulfonates, water-soluble lanolin, sodium chromate, sodium nitrite, glycerol, propylene glycol and the like.

Generally, control of a living organism is achieved in accordance with this invention by contacting the organism with an isothiazolone in an amount which is effective to control said organism. Any of the techniques known in the art can be employed to disseminate the isothiazolones in a manner so as to achieve the desired contact with the organism to be controlled. Spraying and fumigating are typical of such techniques.

The compounds prepared by the process of this invention can be readily utilized as slimicides, algaecides, bactericides, and fungicides in any locus and particularly in aqueous media, such as, for example, water-cooling systems, swimming pools, paper pulp processes, aqueous polymer dispersions, water-based paints, and the like. In addition, these compounds and compositions containing them can function as, for example, fabric and leather preservatives, cosmetic preservatives, soap additives, sanitizing agents, such as in laundry soaps and detergents, and preservatives for metal working compounds, such as emulsifiable cutting oils, preservatives for fuels, fiber spin finish biocides, and the like.

In general, a locus subject to contamination by microorganisms can be protected in accordance with this invention by incorporating into the locus an isothiazolone or a salt of an isothiazolone in an amount which is effective to control said microorganisms. The term "contamination" is meant to include any attack by microorganisms which leads to a chemical or physical breakdown or disintegration of the locus as well as the proliferation of the microorganisms within the locus without an accompanying deleterious effect. The exact amount of isothiazolone required will, of course, vary with the medium being protected, the microorganisms being controled, the particular isothiazolones or compositions containing the isothiazolones being employed and other factors. Typically, in a liquid medium, excellent control is obtained when the isothiazolones are incorporated in the range of 0.1 to 10,000 parts per million (p.p.m.) or 0.00001 to 1% based on the weight of the medium. A range of 1 to 2000 p.p.m. is preferred.

The term "control," as employed in the specification and claims of this application is to be construed as the effect of any means which adversely affects the existence or growth of any living organism or microorganism. This effect may comprise a complete killing action, eradication, arresting in growth, inhibition, reduction in number or any combination thereof.

Outstanding fungistatic activity is exhibited by the isothiazolones when they were employed as paint preservatives and paint fungistats. Microbial activity in water-based and oil-based paint emulsions is effectively inhibited when the isothiazolones are incorporated into the paint. The isothiazolones are also highly active mildewcides for paint films when incorporated in paint formulations.

The isothiazolones prepared by the process of this invention are especially useful as agricultural fungicides. As such, they are particularly valuable when formulated in a fungicidal composition. Such compositions normally comprise an agronomically acceptable carrier and an isothiazolone or mixture of isothiazolones as the active agent. Where necessary or desirable, surfactants or other additives may be incorporated to give uniformly formulated mixtures. By "agronomically acceptable carrier" is meant any substance which can be utilized to dissolve, dispense or diffuse the chemical incorporated therein without impairing the effectiveness of the toxic agent and which does no permanent damage to such environment as soil, equipment and agronomic crops.

Various formulations which would be useful in applying the isothiazoles and isothiazolones will be apparent to those skilled in the art.

Antibacterial and fungicidal activity were evaluated by the Serial Dilution Test (Broth Titer Test) wherein a series of broths containing varying dilutions of a test compound and an organism are halved starting with 1:1000. The values obtained for representative isothiazolones, which are also known in Table I, represent the maximum dilution at which the compound under evaluation renders complete control of the organism. *Staphylococcus aureus* (*S. aureus*) and *Escherichia coli* (*E. coli*) were the bacterial organisms employed in this test, and the fungi employed were *Aspergillus niger* (*A. niger*), *Rhizopus stolonifer* (Rhiz.) and *Rhodotorula* sp. (Rhodo).

filtered to give 37.1 g. of 2-methyl-3-isothiazolone hydrochloride, which could be converted to the free 3-isothiazolone by continuous ether extraction from water. The ethylenedichloride filtrate, upon evaporation to approximately one-half volume, yielded an additional quantity (30.5 g.) of less pure hydrochloride. Complete evaporation of the ethylene dichloride filtrate gave 24.7 g. of oily residue which upon sublimation at 0.1 mm. (40–60° C.)

TABLE I

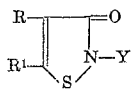

| | | | Fungistatic evaluation | | Bacteriostatic evaluation | |
|---|---|---|---|---|---|---|
| R | R¹ | Y | A. niger | Rhodo (Rhiz.*) | S. aureus | E. coli |
| H | H | —H | 1:16,000 | 1:32,000 | 1:16,000 | 1:32,000 |
| H | —Cl | —H | 1:16,000 | 1:32,000 | 1:64,000 | 1:128,000 |
| H | H | —CH₃ | 1:4,000 | *1:8,000 | 1:16,000 | 1:32,000 |
| H | Cl | —CH₃ | 1:125,000 | *1:500,000 | 1:128,000 | 1:256,000 |
| CH₃ | H | —C₆H₃Cl₂—3,4 | | | 1:250,000 | 1:1,000 |
| H | H | —CONHC₂H₅ | | | 1:256,000 | 1:16,000 |
| CH₃ | H | —H | | | 1:2,000 | 1:8,000 |
| CH₃ | Cl | —H | | | 1:2,000 | 1:32,000 |
| Br | Cl | —H | | | 1:32,000 | 1:32,000 |
| Cl | Cl | —H | | | 1:32,000 | 1:32,000 |
| H | H | —C₂H₄N(C₂H₅)₂ | | | 1:8,000 | 1:4,000 |
| H | H | —CH₂C₆H₄Cl—2 | 1:4,000 | 1:64,000 | 1:64,000 | 1:16,000 |
| H | H | —C₁₀H₂₁₋ₙ | 1:250,000 | 1:500,000 | 1:2,000,000 | 1:16,000 |
| H | H | —C₂H₄CO₂CH₃ | 1:2,600 | 1:4,000 | 1:16,000 | 1:32,000 |
| H | H | —C₂H₄OC₆H₅ | 1:8,000 | 1:32,000 | 1:32,000 | 1:8,000 |

The biocidal properties as well as specific examples of uses in which these biocidal properties are applied are further discussed in United States patent application Ser. No. 672,427, entitled "3-Hydroxyisothiazoles," of G. A. Miller, S. N. Lewis, and A. B. Law, filed on Oct. 3, 1967 (now abandoned), and United States patent application Ser. No. 672,437, entitled "3-Isothiazolones," of S. N. Lewis, G. A. Miller, and A. B. Law, also filed on Oct. 3, 1967 (now U.S. Pat. No. 3,523,121).

In order to more fully demonstrate the novel process of this invention, the following examples are offered by way of illustration, and are not to be construed as limitations thereof.

EXAMPLE 1

Preparation of 3-hydroxyisothiazole and 5-chloro-3-hydroxyisothiazole

In a one liter, 3-necked flask equipped with a mechanical stirrer, thermometer, and dropping funnel there were mixed 500 ml. of ethylene dichloride and 20.8 g. (0.1 mole) of β,β'-dithiodipropionamide. This mixture was stirred at 10–15° C. and 42.5 g. (0.306 mole) of sulfuryl chloride was added dropwise over 2 hours. On completion of the addition, the reaction slurry was allowed to warm to 25–30° C. and stirred overnight to assure complete reaction. The reaction slurry was then filtered and the precipitate was digested in 150 ml. of hot water. The aqueous solution was filtered to remove some insoluble material and then cooled in ice to yield after filtration and drying 4.0 g. of 5-chloro-3-hydroxyisothiazole as a tan crystalline solid, m.p. 95–96° C. The aqueous filtrate was then continuously extracted with ether; the ether extract was dried over magnesium sulfate and evaporated to leave 11.1 g. of 3-hydroxyisothiazole which crystallized upon cooling to a white crystalline solid, m.p. 75–76° C. from benzene-hexane.

EXAMPLE 2

Preparation of 2-methyl-3-isothiazolone and 5-chloro-2-methyl-3-isothiazolone (I)

To an ethylene dichloride (1 liter) slurry of β,β'-dithio-N,N'-dimethyldipropionamide, 70.9 g. (0.3 mole), there was added at 10–15° C. over 1.5 hour 121.5 g. (0.9 mole) of sulfuryl chloride. After addition, the reaction slurry was allowed to warm to 20–25° C. and stirred overnight to assure completion of the reaction. The slurry was then gave 11.5 g. of 5-chloro-2-methyl-3-isothiazolone, m.p. 44–47° C.

EXAMPLE 3

Preparation of 2-(3',4'-dichlorophenyl)-4-methyl-3-isothiazolone

β,β'-Dithio-N,N'-bis(3',4' - dichlorophenyl-diisobutyranilide, 12.8 g. (0.0234 mole), was slurried in 250 ml. of ethylene dichloride, and a solution of 9.5 g. (0.0702 mole) of sulfuryl chloride in 25 ml. of ethylene dichloride was added dropwise at 25–30° C. over one hour. The slurry was stirred overnight to insure completion of the reaction and then filtered to give 8.6 g. of gray 2-(3,4-dichlorophenyl)-4-methyl-3-isothiazolone, m.p. 160–161° C. The product was crystallized from ethyl acetate to give a m.p. of 161–163° C.

EXAMPLE 4

Preparation of 2-(N-ethylcarbamoyl)-3-isothiazolone

In 2500 ml. of ethylene dichloride there was slurried 210.3 g. (0.60 mole) of β,β'-dithio-N,N'-bis(ethylcarbamoyl)dipropionamide at 10–15° C. Nitrogen was bubbled through the slurry to remove the hydrogen chloride to be formed in the reaction, and 243 g. (1.80 mole) of sulfuryl chloride was added dropwise over two hours. The slurry was then allowed to warm to 25–30° C. and stirred overnight to assure complete reaction. After this time the ethylene dichloride was stripped from the reaction solution to leave a yellow oil residue which was crystallized from benzene/ligroin (90–120° C.) to give 142 g. of cream-colored 2-(N-ethylcarbamoyl)-3-isothiazolone, m.p. 97–101° C.

EXAMPLE 5

Preparation of 4-methyl-3-hydroxyisothiazole and 5-chloro-4-methyl-3-hydroxyisothiazole The disulfide-amide, β,β'-dithiodiisobutyramide, 11.8 g. (0.05 mole), was slurried in 200 ml. of ethylene dichloride. A solution of 21.3 g. (0.15 mole) of sulfuryl chloride in 30 ml. of ethylene dichloride was added slowly at 20–25° C. After addition the slurry was allowed to stir overnight to assure complete reaction. Filtration then gave 9.15 g. of a mixture of solid isothiazolonium chlorides, which were heated in 100 ml. of water, and filtered to yield, after drying, 2.85 g. of 5-chloro-4-methyl-3-hydroxyisothiazole, m.p. 122° C. Subsequent cooling of the aqueous solution in ice yielded 2.4 g. of solid 4-methyl-3-hydroxyisothiazole, m.p. 100–105° C.

EXAMPLE 6

Preparation of 4-bromo-5-chloro-3-hydroxyisothiazole

To a solution of 100 ml. of ethyl acetate and 6.8 g. (0.05 mole) of 5-chloro-3-hydroxyisothiazole prepared in accordance with Example 1, there was added at 0° C. a solution of 8 g. (0.05 mole) of bromine in 25 ml. of ethyl acetate. After addition the red reaction solution was allowed to warm to room temperature, and after 1 hour, the solvent was removed under reduced pressure to leave 13.7 g. of dark orange solid. Treatment of this solid with water left, after drying, 8.7 g. of 4-bromo-5-chloro-3-hydroxyisothiazole, m.p. 145–147° C. from ethyl acetate.

EXAMPLE 7

Preparation of 4,5-dichloro-3-hydroxyisothiazole

To an ethyl acetate (100 ml.) solution of 5.1 g. (0.050 mole) of 3-hydroxyisothiazole prepared in accordance with Example 1, there was added 6.75 g. (0.050 mole) of sulfuryl chloride over 20 minutes at 60° C. A white precipitate formed at once. After stirring for 2 hours, the reaction was allowed to come to room temperature. The reaction was filtered from a small amount of solid material, and the solvent was removed under reduced pressure. In this manner, there was obtained 3.7 g. of gummy solid, which by treatment with water and drying gave 3.2 g. of 4,5-dichloro-3-hydroxy-isothiazole, m.p. 151–154° C. after recrystallization from benzene-ethanol.

EXAMPLE 8

Preparation of 2-n-decyl-3-isothiazolone

To a suspension of 293 g. (0.6 mole) of β,β'-dithio-N,N'-bis(n-decyl) dipropionamide in 650 ml. of toluene in a two-liter flask equipped with a stirrer, thermometer, and dropping funnel was added over a period of one hour 134 g. of chlorine at a temperature of 40–45° C. The thick tan suspension turned to a clear dark brown solution during the addition. The solution was then concentrated under reduced pressure until solid separated. The solid was treated with 650 ml. water and an approximately equal volume of ether. After separation of the layers, the ether solution was washed twice with 350 ml. of water and once with 300 ml. of a dilute sodium bicarbonate solution, and dried over anhydrous magnesium sulfate. The ether extract was evaporated, leaving a brown oil which solidified giving 277 g. 2-n-decyl-3-isothiazolone. The product was crystallized from hexane giving a melting point of 40–41° C.

EXAMPLE 9

Preparation of 2-(2'-chlorobenzyl)-3-isothiazolone

To a suspension of 22.8 g. (0.05 mole) of β,β'-dithio-N,N'-bis(2-chlorobenzyl)dipropionamide in 200 ml. of ethylene dichloride in a 500 ml. flask with stirring, thermometer and dropping funnel was added dropwise at room temperature 21.1 g. (0.15 mole plus 5% excess) of sulfuryl chloride. The temperature rose as high as 34° during the addition, and the mixture went from a suspension to a clear solution and back to a suspension again. After stirring overnight at room temperature the solid was collected by filtration and dried in vacuum. This solid hydrochloride (19.5 g.) was triturated with water, turning first to a gum and finally to solid 2-(2'-chlorobenzyl)-3-isothiazolone, 16.4 g. (73%), m.p. 99–100°.

EXAMPLE 10

Preparation of 2-(β-diethylaminoethyl)-3-isothiazolone

Following the procedure of Example 1, using β,β'-dithio-N,N'-bis(β-diethylaminoethyl)dipropionamide and sulfuryl chloride, 2-(β-diethylaminoethyl)-3-isothiazolone was prepared.

EXAMPLE 11

Preparation of 2-(2-carbomethoxyethyl)-3-isothiazolone

Following the procedure of Example 1, using β,β'-dithio-N,N'-bis(2-carbomethoxyethyl)dipropionamide and sulfuryl chloride, 2-(2-carbomethoxyethyl)-3-isothiazolone (boiling point 125° C. at 0.01 mm.) was prepared.

EXAMPLE 12

Preparation of 2-(2-phenoxyethyl)-3-isothiazolone

Following the procedure of Example 1, using β,β'-dithio-N,N'-bis(2-phenoxyethyl)dipropionamide and sulfuryl chloride, 2-(2-phenoxyethyl)-3-isothiazolone (melting point 78–81° C.) was prepared.

EXAMPLE 13

Preparation of 3-hydroxyisothiazole and 5-chloro-3-hydroxyisothiazole (II)

To a one liter, four-necked flask equipped with a mechanical stirrer, solid entrance port, thermometer, gas inlet, gas outlet, and vacuum outlet was charged 250 ml. of anhydrous ethyl acetate. Chlorine was added beneath the surface at a rate of 3.55 g./min. for 2 hours (426 g., 6.0 mole) while, starting 3 minutes after the beginning of the chlorine addition, β-mercaptopropionamide (210 g., 2.0 mole) was added in forty 5.25 g. portions at 3 minute intervals. During this time the temperature was maintained by cooling at 25–30° C. Following addition the reaction was allowed to stir overnight at 25° C. The reaction was purged of hydrogen chloride under vacuum, and was then neutralized at 10–20° C. with 15% aqueous sodium hydroxide solution until the aqueous layer was at pH 4.5 (required 671 g. of 15% NaOH, 2.5 mole). The layers were then separated, the aqueous layer extracted with 250 ml. of ethyl acetate, and the combined organic phase was evaporated under vacuum to give 231 g. of crude 3-hydroxyisothiazole mixture as a soft, brown solid. This isothiazole product consisted of 19% 3-hydroxyisothiazole, 71% 5-chloro-3-hydroxyisothiazole, and 10% 4,5-dichloro-3-hydroxyisothiazole, as determined by gas-liquid chromatography.

EXAMPLE 14

Preparation of 2-methyl-3-isothiazolone and 5-chloro-2-methyl-3-isothiazolone

To 50 ml. of anhydrous ethyl acetate at 10–15° C. was added chlorine gas, 2.13 g. (0.03 mole), at a rate of 0.71 g./min. Maintaining the same chlorine feed rate for a total of 30 minutes, 1.19 g. (0.01 mole) portions of N-methyl-β-mercaptopropionamide were added at 3 minute intervals until 10 portions had been added. Portions 7 and 8 were added together. After the first amide portion the reaction was allowed to exotherm to 25° C., at which point the temperature was controlled for the remainder of the reaction. Following addition the reaction slurry was stirred at 25° C. for 30 minutes, then filtered to give 13.3 g. of isothiazolone product as a white solid, consisting of 39% 2-methyl-3-isothiazolone and 61% 5-chloro-2-methyl-3-isothiazolone, as determined by gas-liquid chromatography.

It is to be understood that changes and variations may be made without departing from the spirit and scope of the invention as defined by the appended claims.

We claim:

1. A process for preparing isothiazolones of the formula

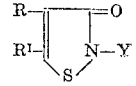

wherein

Y is hydrogen, an alkyl group of 1 to 18 carbon atoms, an aralkyl group of up to 10 carbon atoms, an aryl group of up to 10 carbon atoms, a halogen-, $(C_1-C_4)$ alkyl- or $(C_2-C_4)$ alkoxy-substituted aryl group, a dialkylaminoalkyl group of up to 8 carbon atoms, an alkoxyalkyl group of up to 8 carbon atoms, and aryloxyalkyl group of up to 12 carbon atoms, or a carbamoyl group of the formula

R and $R^I$ may be hydrogen, halogen, or a lower alkyl group; and $R^{II}$ may be an alkyl group of 1 to 18 carbon atoms, which comprises contacting a halogenating agent selected from the group consisting of chlorine, bromine, sulfuryl chloride, sulfuryl bromide, N-chlorosuccinimide, and N-bromosuccinimide with a compound of the formula

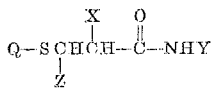

wherein Q is hydrogen or

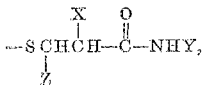

X and Z are individually hydrogen or a lower alkyl group, and
Y is as defined above, and wherein the halogenating agent is present to the extent of at least two mole equivalents when Q is hydrogen or to the extent of at least three mole equivalents when Q is

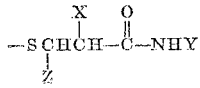

2. A process according to claim 6 wherein Y is hydrogen, an alkyl group, an aralkyl group, an aryl group, a substituted aryl group, a dialkylaminoalkyl group, an alkoxyalkyl group, or an aryloxyalkyl group.

3. A process according to claim 6 wherein Y is a carbamoyl group.

4. A process according to claim 6 wherein Y is an alkyl group of 1 to 18 carbon atoms.

5. A process according to claim 6 wherein Y is hydrogen.

6. A process according to claim 1 wherein Q is

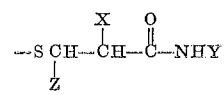

and the halogenating agent is present to the extent of at least 3 mole equivalents.

7. A process according to claim 1 wherein Q is hydrogen and the halogenating agent is present to the extent of at least 2 mole equivalents.

8. A process according to claim 1 wherein the process is carried out in an inert non-aqueous solvent.

9. A process according to claim 6 wherein the halogenating agent is chlorine or sulfuryl chloride.

References Cited
FOREIGN PATENTS 1,555,415   12/1968   France _____ 260—302

OTHER REFERENCES

Luttringhaus et al., Ann., 679, 1964, pp. 123-35.

RICHARD J. GALLAGHER, Primary Examiner

U.S. Cl. X.R.

106—15; 424—270

UNITED STATES PATENT OFFICE
CERTIFICATE OF CORRECTION

Patent No. 3,849,430　　　　　　　　　　Dated November 19, 1974

Inventor(s) Sheldon N. Lewis and George A. Miller

It is certified that error appears in the above-identified patent and that said Letters Patent are hereby corrected as shown below:

In column 2, line 4, "current" should be --correct--.

In column 4, line 30, "controled" should be --controlled--.

In column 9, line 2 of claim 1, "$(C_2-C_4)$" should be --$(C_1-C_4)$--.

Signed and Sealed this

*thirtieth* Day of *December 1975*

[SEAL]

*Attest:*

RUTH C. MASON　　　　　　　　　　　C. MARSHALL DANN
*Attesting Officer*　　　　　　　　　*Commissioner of Patents and Trademarks*